(12) United States Patent
Bonhote et al.

(10) Patent No.: US 7,459,198 B2
(45) Date of Patent: Dec. 2, 2008

(54) STRESS RELIEF FOR ELECTROPLATED FILMS

(75) Inventors: Christian R. Bonhote, San Jose, CA (US); Heather K. DeSimone, Morgan Hill, CA (US); John W. Lam, San Jose, CA (US); Matthew W. Last, San Jose, CA (US); Edward Hin Pong Lee, San Jose, CA (US); Ian R. McFadyen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 692 days.

(21) Appl. No.: 10/856,090

(22) Filed: May 28, 2004

(65) Prior Publication Data

US 2005/0266262 A1 Dec. 1, 2005

(51) Int. Cl.
| | |
|---|---|
| B32B 3/10 | (2006.01) |
| B32B 3/02 | (2006.01) |
| B32B 3/12 | (2006.01) |
| B32B 15/00 | (2006.01) |
| C25D 5/02 | (2006.01) |
| C25D 5/34 | (2006.01) |

(52) U.S. Cl. .............. 428/174; 428/192; 428/212; 428/220; 205/112; 205/118; 205/238; 205/255

(58) Field of Classification Search ............... 428/611; 205/118
See application file for complete search history.

(56) References Cited

U.S. PATENT DOCUMENTS

| | | | |
|---|---|---|---|
| 4,500,177 A | 2/1985 | MacNeal .................... 350/376 |
| 5,516,418 A | 5/1996 | Doss et al. .................. 205/119 |
| 5,545,307 A * | 8/1996 | Doss et al. .................. 205/122 |
| 5,626,736 A | 5/1997 | Florio et al. ................ 205/125 |
| 5,713,122 A | 2/1998 | Aboaf et al. ............. 29/603.08 |
| 5,745,978 A | 5/1998 | Aboaf et al. ............. 29/603.08 |
| 5,917,231 A * | 6/1999 | Kasai ......................... 257/633 |
| 6,131,271 A | 10/2000 | Fontana, Jr. et al. ...... 29/603.14 |
| 6,185,961 B1 | 2/2001 | Tonucci et al. ............... 65/60.4 |
| 6,286,200 B1 * | 9/2001 | Huang et al. ............. 29/603.12 |
| 6,489,182 B2 * | 12/2002 | Kwon ......................... 438/110 |
| 6,493,191 B1 * | 12/2002 | Cain et al. ............... 360/246.2 |
| 6,729,927 B2 * | 5/2004 | Stagnitto et al. .............. 445/47 |
| 6,793,961 B2 * | 9/2004 | Nikitin et al. ................. 427/58 |
| 6,872,599 B1 * | 3/2005 | Li et al. ...................... 438/123 |
| 6,894,374 B2 * | 5/2005 | Yoshino et al. ............. 257/668 |
| 6,967,163 B2 * | 11/2005 | Akiyoshi .................... 438/678 |
| 2004/0001964 A1 | 1/2004 | Ohkura et al. ............. 428/596 |
| 2004/0115342 A1* | 6/2004 | Shigemura .................. 427/143 |

FOREIGN PATENT DOCUMENTS

JP 04-279012 10/1992

* cited by examiner

Primary Examiner—Keith D. Hendricks
Assistant Examiner—Jason L Savage
(74) Attorney, Agent, or Firm—Silicon Valley Patent Group LLP

(57) ABSTRACT

An electroplated film is deposited over a substrate with a plating frame pattern that includes a plating field defined by a plurality of individual features. By dividing the plating field into a plurality of individual features, the delamination force at any location on the plating field is greatly reduced. Thus, a film with a large stress, such as a high moment film, may be plated to a greater thickness than is possible with conventionally plated films.

25 Claims, 3 Drawing Sheets

STRESS RELIEF FOR ELECTROPLATED FILMS

FIELD OF THE INVENTION

The present invention relates to electroplating and in particular to patterned electroplating of films with a large stress.

BACKGROUND

Electroplating is used in the manufacture of, e.g., thin film inductive heads used in magnetic recording systems, such as disk drives, as well as micromechanical structure fabrication, such as for microactuators and magnetic micromotors. Electroplating generally involves electroplating on a substrate, through a patterned photosensitive resist film, with the desired feature and surrounding plating field. The surrounding plating field is not part of the desired feature, but is used to ensure good thickness and alloy composition uniformity in small features.

When electroplating a layer with a large tensile stress, such as with a thick layer of high magnetic moment material, the surrounding plating field has a tendency to delaminate. Delamination is generally undesirable even when it occurs in an area other than the desired feature, i.e., in the plating field. An underlying adhesion layer is sometimes used to help prevent delamination. Nevertheless, delamination may still occur when a layer has a large tensile stress.

FIGS. 1 and 2 illustrate a top plan view and cross sectional view (along line A-A) of a conventionally electroplated substrate 100 and a delaminated plating field 110. As illustrated, the substrate 100, which may be, e.g., alumina, is covered with an adhesion layer 102 and a seed layer 104. As illustrated in FIG. 2, a thick layer 106 of high moment material, such as CoFe, is electroplated over the adhesion and seed layers 102, 104.

A portion of the plated layer 106 forms the desired feature 108 (shown in FIG. 1) under manufacture, while another portion of the plated layer 106 forms the plating field 110 (shown in FIG. 1). The plating field 110 surrounds the feature 108 and is separated by a non-plated area 109. The layer 106 is conventionally formed using a resist pattern to define the desired feature 108 and the field portion 110.

Plated high moment materials, e.g., CoFe alloys of greater than or equal to 2.4 T moment, have a large amount of tensile stress. When a relatively thick layer of the high moment material is plated, the stress is sufficient to delaminate the layer from underlying layers or substrate, particularly near any sharp corner, angular or non-smooth surfaces. Thus, as illustrated in FIGS. 1 and 2, the corners 110a and 110b of the plating field 110 have become delaminated.

As is well understood in the art, unintentional delamination of a plated layer is undesirable. For example, an undesirable under-filling of the area under the delaminated portion of the layer may occur during subsequent processing. Additionally, the stress on the plated layer may be sufficient to damage the underlying substrate 100, as illustrated at corner 110a in FIG. 2.

For a given stress, the delamination force in an electroplated layer is a function of the thickness of the layer. By way of example, a layer with a stress of approximately 400 MPa will typically delaminate at a thickness of approximately 2 µm and a layer with a stress of approximately 600 MPa will typically delaminate at a thickness of approximately 0.5 to 1 µm. Accordingly, the delamination of an electroplated layer of material having a given stress is prevented conventionally by limiting the thickness of the plated layer. By way of example, to avoid the delamination of a high moment layer, e.g., with a moment of 2.4 T (which has a stress of 400 Mpa); the maximum thickness of the plating field is limited to approximately 2 µm. Unfortunately, it is sometimes desirable to plate a layer of high stress material to a thickness that is greater than its conventional maximum thickness.

Accordingly, what is needed is an improvement to electroplating that decreases the chance of delamination of the plated layer.

SUMMARY

In accordance with an embodiment of the present invention, an electroplated film is deposited over a substrate with a plating frame pattern that includes a plating field defined by a plurality of individual features. The individual features reduce the contiguous area of the film thereby reducing the delamination force at any location on the plating field. Thus, a film with a large stress, such as a high moment film, may be plated to a greater thickness than is possible with conventionally plated films.

Accordingly, in one aspect of the present invention, a method includes providing a substrate and depositing a seed layer over the substrate. A plated layer is electroplated over the seed layer. The plated layer includes a frame pattern having a permanent feature surrounded by a plurality of individual features that define a plating field. In one embodiment, a photoresist layer is deposited over the seed layer and is exposed and developed to define the frame pattern. The developed photoresist layer is then stripped.

In another aspect, a structure includes a substrate and a seed layer disposed over the substrate. A mask is disposed over the seed layer. The mask defines a frame pattern having a permanent feature and a surrounding plating field, where the plating field is comprised of a plurality of individual features. In one embodiment, the mask is a photoresist mask.

BRIEF DESCRIPTION OF THE DRAWINGS

FIGS. 5-9 are illustrative of producing the structure of FIG. 3, where FIGS. 5-7 and 9 illustrate cross sectional views of the structure in FIG. 3 in various stages of fabrication and FIG. 8 illustrates a top plan view of a photoresist mask.

DETAILED DESCRIPTION

In accordance with an embodiment of the present invention, the delamination force on an electroplated layer is reduced by producing a field of non-contiguous individual features. The use of individual non-contiguous features in the field reduces the contiguous surface area of the layer, which decreases the delamination force. Accordingly, a film with a large stress, such as a high moment film, may be plated to a thickness that is greater than conventionally plated films.

Figure 1:
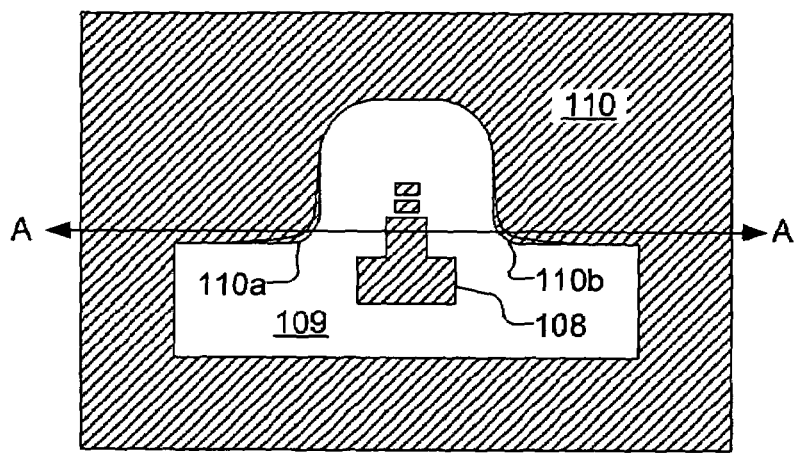
FIGS. 1 and 2 illustrate a top plan view and cross sectional view of a conventionally electroplated substrate and a delaminated plating field.
Figure 2:
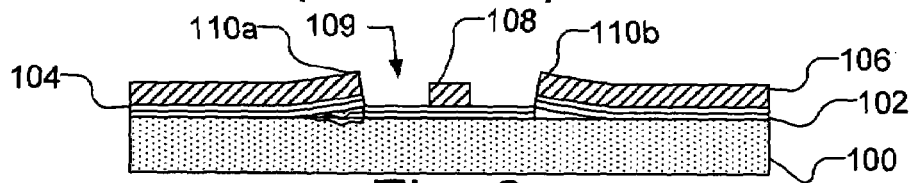
Figure 3:
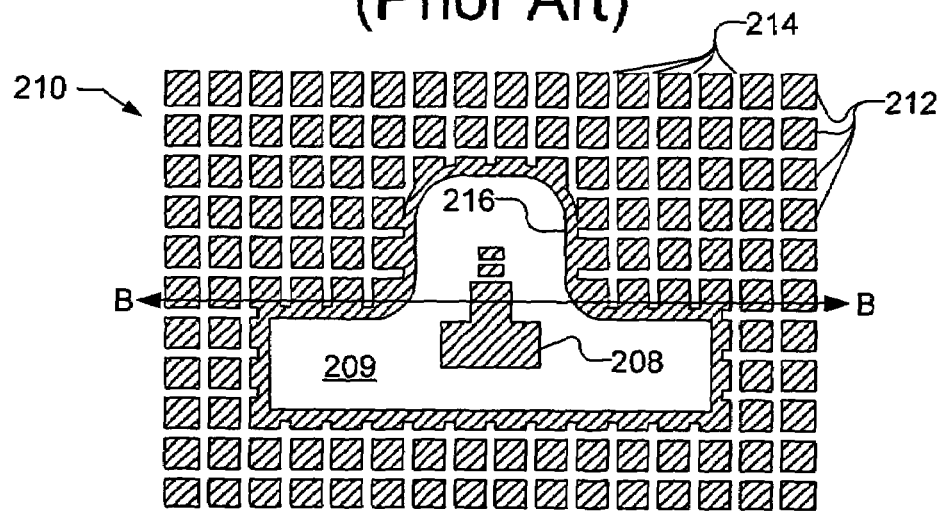
FIGS. 3 and 4 illustrate a respective top plan view and cross sectional view of a substrate that has been electroplated in accordance with an embodiment of the present invention.
Figure 4:
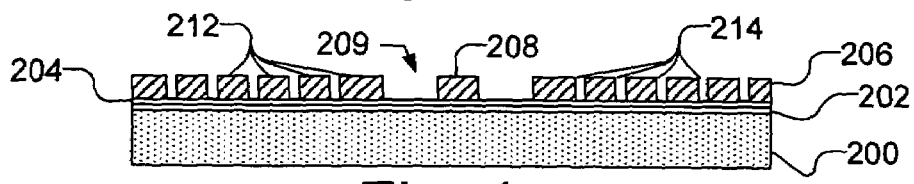

FIGS. 3 and 4 illustrate a respective top plan view and cross sectional view (along line B-B) of a substrate 200 that has been electroplated in accordance with an embodiment of the present invention. As illustrated, the substrate 200 is covered with an adhesion layer 202 and a seed layer 204, and a thick plated layer 206 of high moment material. The plated layer 206 forms a feature 208 and a surrounding plating field 210.

The structure illustrated in FIGS. 3 and 4 may be used, e.g., in the production of a write head or other devices in which electroplating is desirable. It should be understood that the structure in FIG. 3 is merely exemplary and that other structures and shapes may be used with the present invention. Moreover, it should be understood that, in practice, it may be desirable to form a plurality structures that are similar or different from the structure shown in FIG. 3 on a single substrate or wafer.

The plated layer 206 forms a relatively small feature 208 and a surrounding plating field 210, which are separated by a non-plated area 209. The small feature 208 is the feature under manufacture and is permanent, while the plating field 210 may be removed. Where the permanent feature 208 has a feature size of, e.g., approximately 10 μm per side, the non-plated area 209 may be, e.g., approximately 20 μm wide. Of course, other dimensions may be used. The dimensions used are dependent on many factors, including the device under manufacture. The plating field 210 is formed from a plurality of individual features 212 that are separated from each other by non-plated gaps 214, which extend through layer 206 to the underlying layer, e.g., seed layer 204. The use of a plating field 210 formed from individual features 212 advantageously reduces the delamination force on the plating field 210. Thus, layer 206 may be plated without delamination, despite having a tensile stress and thickness that would cause delamination in a conventionally plated layer.

In one embodiment, the individual features 212 are all separated from each other, i.e., the features 212 are non-contiguous within the electroplated layer 206. In other embodiments, some or all of the features 212 may be connected to one another by a filament within the electroplated layer 206. By way of example, in one embodiment, the plating field 210 may include a border 216 that continuously extends around the periphery of non-plated area 209. The border 216 may contact several of the individual features 212 around the periphery of non-plated area 209. In other embodiments, however, the border 216 may be physically separated from any individual features 212. The use of border 216 prevents material from undesirably filling in the gaps 214 near the feature 208 during subsequent processing.

The delamination force at any location in a plated film is proportional to the product of the film stress, the film thickness, and the film area, i.e., the area of contiguous film. By forming the plating field 210 as a number of separated features 212, the film area is reduced, which correspondingly reduces the force at any location on the plating field 210. Accordingly, the thickness of layer 206 may be greater than what is possible in conventionally plated layers without delamination. Moreover, because the gaps 214 between the individual features 212 that make up the plating field 210 is small there is little or no deleterious effect on the performance of the plating field 210. By way of example, the total area of gaps 214 should be, e.g., approximately 5% or less, of the total area of the plated field. It should be understood, however, that the gaps 214 serve merely to separate the individual features 212. Thus, there is no theoretical lower limit to the size of the gaps 214, as long as the features 212 are separated. There, of course, may be practical limitations on the minimum size of the gaps 214, which depend, e.g., on the processing techniques used.

Figure 10:
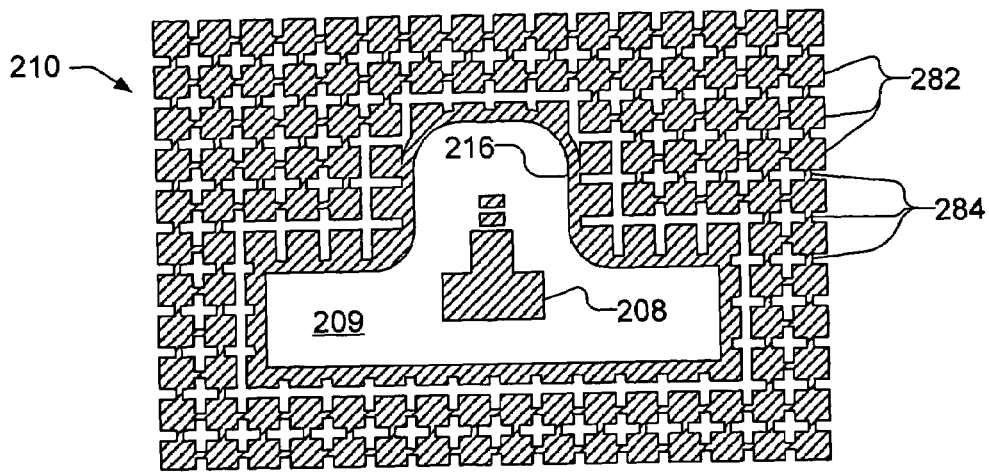
FIG. 10 illustrates a top plan view of a structure similar to that shown in FIG. 3 with the individual elements connected.

In another embodiment, the individual elements in the plating field are not completely separated, but may contact each other. FIG. 10, by way of example, shows a top plan view of a structure similar to that shown in FIG. 3, like designated elements being the same. FIG. 10, however, shows the individual element 282 being connected to one anther by a small filament 284. The filament 284 is too small to produce a significant delamination force on the elements, however, and, thus, delamination of the elements 282 does not occur.

Figure 5:
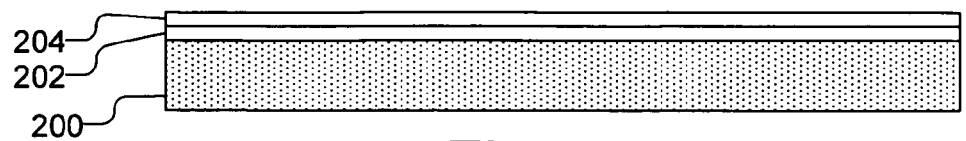
FIGS. 5-7, 9 illustrate cross sectional views of the structure in FIG. 3 along line B-B in various stages of fabrication.

FIGS. 5-9 are illustrative of the process of producing the structure of FIG. 3, in accordance with an embodiment of the present invention. FIGS. 5-7 and 9 illustrate cross sectional views of the structure in FIG. 3 along line B-B in various stages of fabrication. As illustrated in FIG. 5, a substrate 200 of, e.g., alumina or other appropriate material, is provided and an adhesion layer 202 and seed layer 204 are respectively deposited over the substrate 200. The adhesion layer 202 may be, e.g., tantalum, chromium, or NiCr, that is sputter deposited to a thickness of, e.g., approximately 30-200 Å. In one embodiment, 100 Å of sputter deposited tantalum was used. The seed layer 204 may be magnetic metals or alloys containing, e.g., cobalt, iron or nickel, or other non-magnetic metals or alloys, containing, e.g., rhodium, copper and palladium. The seed layer 204 may be, e.g., sputter deposited over the adhesion layer 202 to a thickness of, e.g., approximately 300-2000 Å. In one embodiment, a seed layer 204 of sputter deposited CoFe alloy was used. Of course, any appropriate material and thickness may be used.

If desired, the adhesion layer 202 may be omitted. Without the presence of the adhesion layer 202, the thickness at which the plating field 210 delaminates may be less than if the adhesion layer 202 is used. Nevertheless, eliminating the adhesion layer 202 may be advantageous as the adhesion layer 202 is typically non-magnetic and eliminating non-magnetic films may be useful in some applications, such as in the production of a write head. Moreover, in accordance with the present invention, even without the adhesion layer 202, the plating field 210 may be thick relative to conventionally deposited plated fields.

Figure 6:
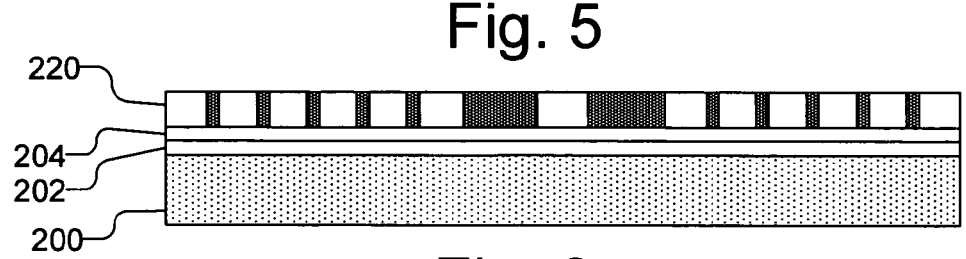
Figure 7:
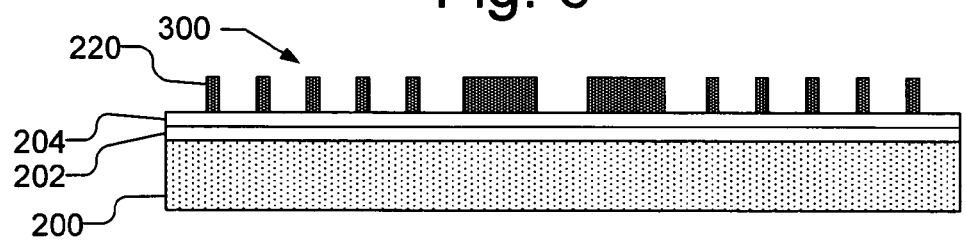
Figure 8:
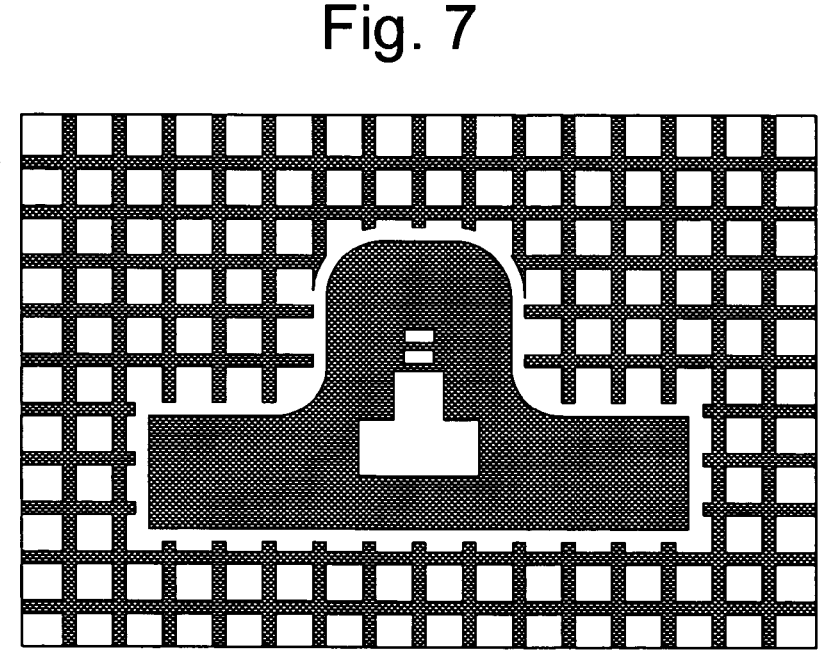

As illustrated in FIG. 6, a layer of photoresist 220 is deposited over the seed layer 204. The layer of photoresist 220 is lithographically exposed with the desired plating frame pattern. The resist image in the layer of photoresist 220 is then conventionally developed resulting in a mask 300 shown in cross section in FIG. 7 and top plan view in FIG. 8. FIG. 8 shows the mask 300 containing the plating frame pattern used to form the structure shown in FIG. 3. It should be understood that mask 300 shows only a portion of the mask and that the mask 300 may include a plurality of the patterns to produce a number of similar patterns on the same substrate.

Figure 9:
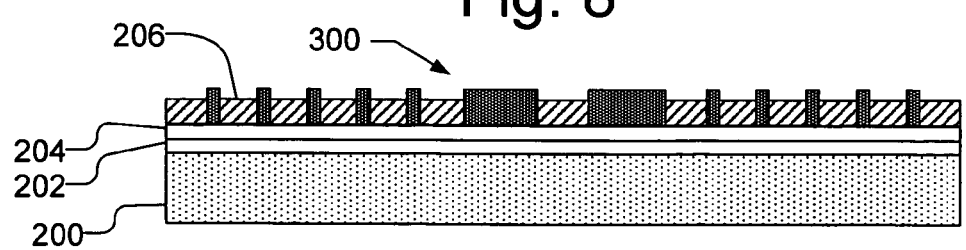

The structure is then electroplated with the desired material, e.g., an alloy of at least one of cobalt, iron, and nickel. In one embodiment, 4 μm of plated CoFe alloy, with a film stress of 500 MPa was used. FIG. 9 illustrates the resulting structure with the plated layer 206 deposited within the areas defined by the mask 300. The photoresist mask 300 is then stripped to result in the structure shown in FIGS. 3 and 4.

As described above, because the delamination force on the plating field 210 is advantageously reduced, the maximum thickness of the plated material, i.e., the thickness at which delamination occurs, is increased relative to conventional processing. It should be understood that the maximum thickness of an electroplated layer is a function of the stress in the material. For example, using the present invention, an electroplated layer having a stress of 600 MPa can be safely plated to thicknesses greater than 0.5 µm without delamination, whereas conventional plating of such a plated layer may result in delamination. Similarly, an electroplated layer with a stress of 400 MPa can be safely plated to a thickness that is greater than 2 µm, and possibly 4 µm, without delamination using the present invention, whereas conventional plating of such a plated layer may result in delamination.

It should be understood, of course, that the present invention is not limited to the particular materials or thicknesses illustrated, but that other materials and dimensions may be used if desired. By way of example, the individual features 212 in the plating field 210 may be approximately the same size or smaller than the largest portion of the desired permanent feature 208. In a properly designed device, the area of the desired permanent feature 208 is too small to generate enough force to delaminate. Accordingly, by limiting the area of the individual features 212 in the plating field 210 to approximately the area of the permanent feature 208, the individual features 212 in the plating field 210 should not delaminate. In one embodiment, the individual features 212 had dimensions of approximately 80 µm×80 µm and the gaps 214 had a width of approximately 10 µm. With proper modification of the shape of the individual features 212, e.g., by reducing the angle or eliminating any corners in the individual features 212, the individual features 212 may have a significantly larger area than the permanent feature 208.

Figure 11:
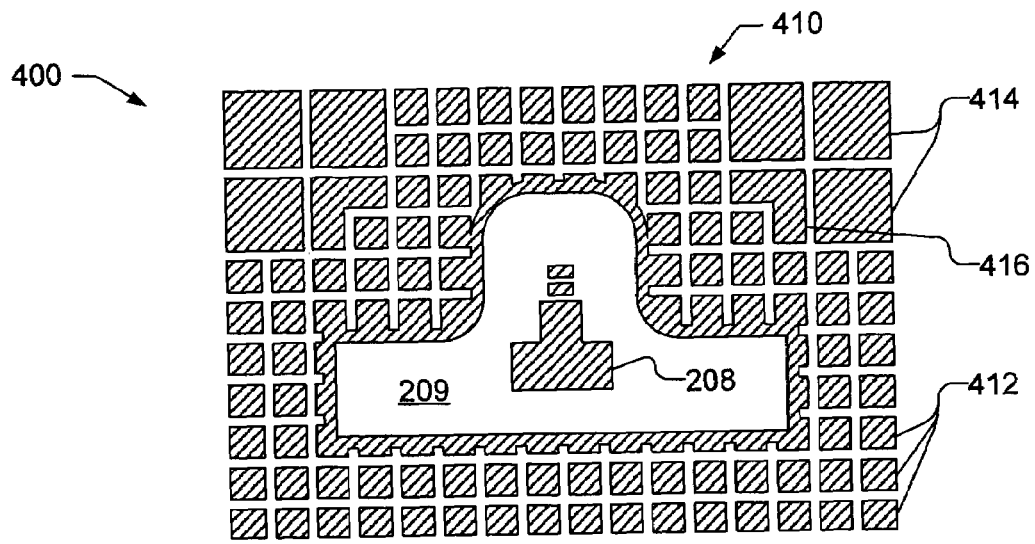
FIG. 11 illustrates a top plan view of a structure similar to that shown in FIG. 3 with different sized and dimensioned individual elements in the plating field.

Additionally, it should be understood that the individual features 212 in the plating field 210 need not be of uniform sizes or shapes and do not need to be symmetrical. For example, FIG. 11 illustrates a structure 400 similar to the structure shown in FIG. 3, like designated elements being the same. The plating field 410 of the structure 400 in FIG. 11, however, includes both a number of small individual features 212 and a number of larger individual features 414. As illustrated, the larger individual features 414 may be relatively distant from the permanent feature 208. FIG. 11 also illustrates that some features 416 of the plating field 410 may have a geometric shape that differs from other features 412 or 212 in the plating field 410.

Figure 12:
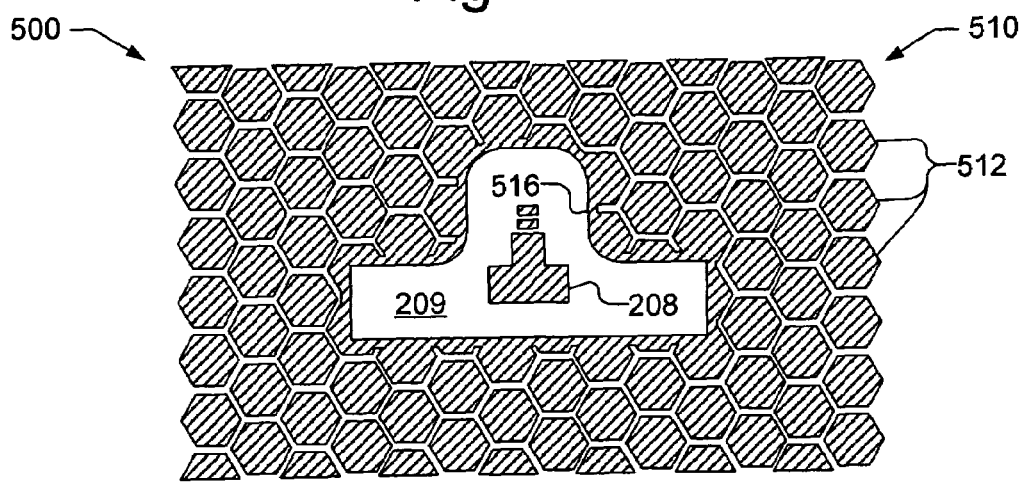
FIG. 12 illustrates a top plan view of a structure similar to that shown in FIG. 3 with different shaped individual elements in the plating field.

FIG. 12 illustrates another structure 500 similar to the structure shown in FIG. 3, like designated elements being the same. As illustrated in FIG. 12, however, the plating field 510 may include individual features 512 that have a geometric shape other than the square or rectangular shape shown in FIG. 3. The individual features 512 shown in FIG. 12, by way of example, have a hexagon shape. If desired, other polygonal shapes may be used. Further, more than one geometric shape or patterns may be used in the plating field 510 if desired. As illustrated in FIG. 12, the plating field 512 may include a border 516 if desired.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
providing a substrate;
depositing a seed layer over the substrate; and
electroplating over the seed layer a plated layer with a frame pattern having at least one permanent feature surrounded by a plurality of individual features that define a plating field for the at least one permanent feature;
wherein there are more individual features in the plurality of individual features that define the plating field than permanent features in the at least one permanent feature.

2. The method of claim 1, the method further comprising:
depositing a photoresist layer over the seed layer;
exposing the photoresist layer through a mask having the frame pattern;
developing the photoresist layer having the frame pattern to form a photoresist frame pattern, wherein electroplating a plated layer is performed within the photoresist frame pattern; and
stripping the photoresist frame pattern.

3. The method of claim 1, further comprising depositing an adhesion layer over the substrate prior to depositing the seed layer, wherein the seed layer is deposited over the adhesion layer.

4. The method of claim 1, wherein the frame pattern further has a border that surrounds the permanent feature, the border further defining the plating field.

5. The method of claim 4, wherein the border physically contacts a plurality of the individual features in the plating field.

6. The method of claim 4, wherein the border is continuous.

7. The method of claim 1, wherein the plurality of individual features are non contiguous.

8. The method of claim 1, wherein each of the plurality of individual features have an area that is approximately the same area as the permanent feature.

9. The method of claim 1, wherein a plurality of the individual features that define the plating field have a polygonal shape.

10. The method of claim 9, wherein the polygonal shape of the individual features is at least one of rectangular, square, and hexagon.

11. The method of claim 1, wherein the plated layer is an alloy containing at least one of cobalt, iron and nickel having a thickness greater than approximately 0.5 µm.

12. The method of claim 11, wherein the plated layer has a stress greater than approximately 400 MPa and a thickness of greater than approximately 2 µm.

13. A structure comprising:
a substrate;
a seed layer disposed over the substrate; and
a mask disposed over the seed layer, the mask defining a frame pattern having at least one permanent feature and a surrounding plating field, the plating field comprised of a plurality of individual features associated with the permanent feature;
wherein there are more individual features in the plurality of individual features than permanent features in the at least one permanent feature.

14. The structure of claim 13, further comprising an electroplated layer disposed over the seed layer within the field pattern defined by the mask.

15. The structure of claim 13, wherein the electroplated layer is an alloy containing at least one of cobalt, iron and nickel having a thickness greater than 0.5 µm.

16. The method of claim 15, wherein the plated layer has a stress greater than approximately 400 MPa and a thickness of greater than approximately 2 µm.

17. The structure of claim 13, wherein the mask is a developed photoresist layer.

18. The structure of claim 13, further comprising an adhesion layer disposed over the substrate, wherein the seed layer is disposed over the adhesion layer.

19. The structure of claim 13, wherein the plating field is further comprised of a border that surrounds the permanent feature.

20. The structure of claim 13, wherein the border physically contacts a plurality of the individual features in the plating field.

21. The structure of claim 13, wherein the border is continuous.

22. The structure of claim 13, wherein the plurality of individual features are non contiguous.

23. The structure of claim 13, wherein each of the plurality of individual features have an area that is approximately the same area as the permanent feature.

24. The structure of claim 13, wherein a plurality of the individual features that define the plating field have a polygonal shape.

25. The structure of claim 24, wherein the polygonal shape of the individual features is at least one of rectangular, square, and hexagon.

* * * * *